United States Patent
Li et al.

(10) Patent No.: US 12,398,778 B2
(45) Date of Patent: Aug. 26, 2025

(54) SYSTEM FOR ABSORBING FLEXURAL WAVES ACTING UPON A STRUCTURE

(71) Applicant: Toyota Motor Engineering & Manufacturing North America, Inc., Plano, TX (US)

(72) Inventors: Xiaopeng Li, Ann Arbor, MI (US); Ziqi Yu, Ann Arbor, MI (US); Taehwa Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 941 days.

(21) Appl. No.: 17/536,582

(22) Filed: Nov. 29, 2021

(65) Prior Publication Data

US 2023/0167877 A1 Jun. 1, 2023

(51) Int. Cl.
F16F 15/04 (2006.01)
F16F 7/10 (2006.01)

(52) U.S. Cl.
CPC ............ *F16F 15/04* (2013.01); *F16F 7/1005* (2013.01)

(58) Field of Classification Search
CPC ................................ F16F 15/04; F16F 7/1005
See application file for complete search history.

(56) References Cited

U.S. PATENT DOCUMENTS

| | | | | |
|---|---|---|---|---|
| 3,818,767 A | * | 6/1974 | Donohue | B64G 1/28 244/165 |
| 4,373,608 A | * | 2/1983 | Holmes | F16F 7/10 181/208 |
| 5,209,326 A | * | 5/1993 | Harper | F16F 7/1005 267/136 |
| 5,906,254 A | * | 5/1999 | Schmidt | F16F 7/1005 267/136 |
| 9,444,403 B2 | | 9/2016 | Yamada | |
| 2017/0037927 A1 | * | 2/2017 | Buesing | F16F 15/04 |
| 2022/0051650 A1 | * | 2/2022 | Lee | G10K 11/172 |

FOREIGN PATENT DOCUMENTS

| | | |
|---|---|---|
| JP | 2006207749 A | 8/2006 |
| JP | 2016109283 A | 6/2016 |

OTHER PUBLICATIONS

Chen, Y. Y., R. Zhu, M. V. Barnhart, and G. L. Huang. "Enhanced flexural wave sensing by adaptive gradient-index metamaterials." Scientific reports 6 (2016): 35048.

Leng, Julien. "Controlling flexural waves using subwavelength perfect absorbers: application to Acoustic Black Holes." PhD diss., Université du Maine, 2019.

Viana, Felipe Antonio C., and Valder Steffen Jr. "Multimodal vibration damping through piezoelectric patches and optimal resonant shunting circuits." Journal of the Brazilian Society of Mechanical Sciences and Engineering 28, No. 3 (2006): 293-310.

* cited by examiner

*Primary Examiner* — Vishal R Sahni
(74) *Attorney, Agent, or Firm* — Christopher G. Darrow; Darrow Mustafa PC (57) ABSTRACT

Described are systems for absorbing flexural waves acting on a structure. In one example, the system includes a first resonator connected to a structure at a first location and a second resonator connected to the structure at a second location. The distance between the first location and the second location is based on a frequency of a flexural wave acting upon the structure and an orientation of the first resonator and the second resonator with respect to each other.

15 Claims, 6 Drawing Sheets

SYSTEM FOR ABSORBING FLEXURAL WAVES ACTING UPON A STRUCTURE

TECHNICAL FIELD

The subject matter described herein relates, in general, to systems for absorbing flexural waves acting upon a structure.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some structures, such as beams, are designed to support lateral loads. In doing so, the displacement is predominantly transverse to the centerline, and internal shear forces and bending moments are generated. This dynamic behavior of beams is called flexural motion in the form of flexural waves, sometimes referred to as bending waves. Flexural waves can deform a structure transversely as the flexural waves propagate. These waves are more complicated than compressional or shear waves and depend on the material and geometric properties of the structures they are acting upon. Flexural waves are also dispersive since different frequencies travel at different speeds.

SUMMARY

This section generally summarizes the disclosure and does not comprehensively explain its full scope or all its features.

In one example, a system includes a first resonator connected to a structure at a first location and a second resonator connected to the structure at a second location. The distance between the first and second locations is based on a frequency of a flexural wave acting upon the structure and an orientation of the first resonator and the second resonator with respect to each other.

In another example, a system includes a top set of resonators connected to a top side of a structure. The top set of resonators may be separated from each other at a first distance based on a frequency of a flexural wave acting upon the structure and an orientation of the top set of resonators with respect to each other. The system may also include a bottom set of resonators connected to the bottom side of the structure. The bottom set of resonators are separated from each other at a second distance based on the frequency of the flexural wave acting upon the structure and an orientation of the bottom set of resonators with respect to each other.

In yet another example, the system includes a first set of resonators and a second set of resonators connected to a structure. The first set of resonators are separated from each other at a first distance based on a first frequency of a first flexural wave acting upon the structure and an orientation of the first set of resonators with respect to each other. The second set of resonators are separated from each other at a second distance based on a second frequency of a second flexural wave acting upon the structure and an orientation of the second set of resonators with respect to each other.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described herein are examples of systems that can absorb flexural waves acting upon a structure, such as a beam. In one example, a system for absorbing flexural waves acting on a structure includes two resonators connected to the beam at two different locations. Each of the two resonators may be cantilever beam type resonators that include a base connected to the beam and a cantilever member extending from the base. The two resonators may be orientated such that their cantilever members extend from the base substantially toward each other (face toward each other) and/or substantially away from each other (face away from each other).

The distances between where the resonators are connected to the beam can vary based on their orientation with respect to each other and the frequency of the flexural wave to be absorbed. For example, in situations where the resonators face towards each other, the distance where the resonators are connected to the beam will be different than in situations where the resonators face away from each other. Further still, these distances would differ even in situations when the resonators face toward the same direction. Allowing the resonators to face toward or away from each other allows for a more compact and efficient design based on the application and needs regarding the absorption of a flexural wave acting upon the structure.

Figure 1:
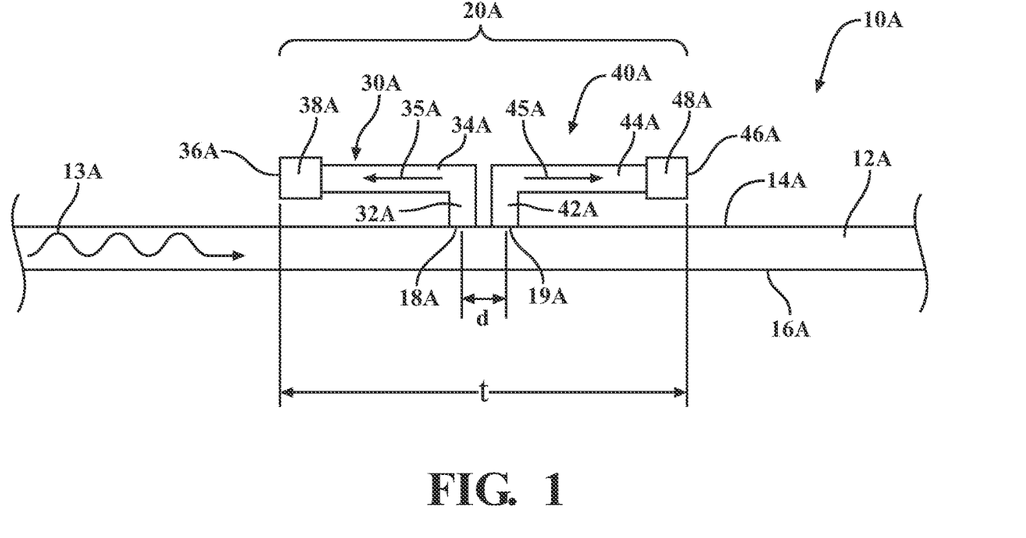
FIG. 1 illustrates a system for absorbing a flexural wave acting upon a structure having resonators that substantially face away from one another.

Referring to FIG. 1, illustrated is an example of a system 10A for absorbing a flexural wave. In this example, the system 10A includes a structure 12A that may be in the form of a beam. The structure 12A may include a top side 14A and a bottom side 16A. The top side 14A and/or the bottom side 16A may be substantially flat but may also be uneven. The structure 12A can vary significantly from application to application and can take any one of a number of different shapes. Furthermore, the structure 12A can be made of a number of different materials or combinations of different materials.

In this example, the structure 12A is shown to have a flexural wave 13A acting upon the structure 12A. The flexural wave 13A can be a single flexural wave or may be multiple flexural waves having the same, similar, or even different frequencies. Flexural waves, sometimes referred to as bending waves, may deform the structure 12A transversely as they propagate. Flexural waves are more complicated than compressional or shear waves and depend on material properties as well as geometric properties of the structure 12A.

In the system 10A, a set 20A of resonators 30A and 40A are connected to the top side 14A of the structure 12A. In this example, the resonator 30A includes a base 32A connected to the top side 14A of the structure 12A at a first location 18A. The base 32A may extend upward from the top side 14A of the structure 12A to a cantilever member 34A. The cantilever member 34A may extend from the base 32A in a direction 35A towards a terminal end 36A, which may include a mass 38A. In this example, the direction 35A is substantially parallel to a plane defined by the surface, forming the top side 14A of the structure 12A. It should be understood that the direction 35A may vary from application to application and does not necessarily need to be substantially parallel to a plane defined by the surface of the structure 12A.

As to the resonator 40A, the resonator 40A may be similar to the resonator 30A in some respects. As such, the resonator 40A includes a base 42A connected to the top side 14A of the structure 12A at a second location 19A. The base 42A may extend upward from the top side 14A of the structure 12A to a cantilever member 44A. The cantilever member 44A may extend from the base 42A in a direction 45A towards a terminal end 46A, which may include a mass 48A. In this example, the direction 45A is substantially parallel to a plane defined by the surface forming the top side 14A of the structure 12A. It should be understood that the direction 45A may vary from application to application and does not necessarily need to be substantially parallel to a surface of the structure 12A.

It is noted that in this example, the resonators 30A and 40A are orientated such that they face away from one another. In other words, the directions 35A and 45A in which the cantilever members 34A and 44A extend from their bases 32A and 42A, respectively, substantially oppose each other and extend away from each other. Additionally, it is noted that one of the resonators 30A or 40A may be a lossless resonator, while the other resonator may be a lossy resonator. A lossless resonator is a resonator that can be expressed as a mass-spring system, while a lossy resonator is a resonator that can be expressed as a mass-spring-damper system.

The resonators 30A and 40A may each have a resonant frequency that is substantially similar to the frequency of the flexural wave 13A to be absorbed. The resonant frequency of the resonators 30A and 40A is determined by the overall physical dimensions of the resonator and/or the mechanical properties, such as the modulus of the materials that form the resonator. The resonators 30A and 40A can be expressed as a mass-spring system, in the case of a lossless resonator, and/or a mass-spring-damper system, in the case of a lossy resonator by considering the first mode of the resonator.

In a situation where one of the resonators 30A and/or 40A is a lossless resonator, the following equation is utilized to determine the resonant frequency of the resonator:

$$\omega_0 = \sqrt{\frac{k}{m}}, \qquad (1)$$

where $\omega_0$ is the resonant frequency, k is the spring constant, and m is the mass. As such, the overall physical dimensions of the resonator and/or materials forming the resonator will be such that it has a resonant frequency substantially similar to that of the flexural wave 13A.

In a situation where one of the resonators 30A and/or 40A is a lossy resonator, the following equation is utilized to determine the resonant frequency of the resonator as well as determine the overall physical dimensions of the resonator so that the resonator can have a resonant frequency substantially similar to the resonant frequency of the flexural wave 13A:

$$f_d = f_n \sqrt{1 - 2\xi^2}, \qquad (2)$$

where $f_d$ is the damped resonant frequency, $f_n$ is the undamped resonant frequency and is the damping ratio. The damping ratio can be determined using the following equation:

$$\zeta = \frac{c}{2\sqrt{km}}, \qquad (3)$$

where c is the damping coefficient, k is the spring constant, and m is the mass

The distance d between the locations 18A and 19A where the bases 32A and 42A are connected to the top side 14A of the structure 12A, respectively, are based, at least in part, on the frequency of the flexural wave 13A to be absorbed and the orientation of the resonators 30A and 40A with respect to one another. Generally, the distance d between the locations 18A and 19A may be expressed as:

$$d = a\lambda, \qquad (4)$$

where d between the locations 18A and 19A, α is a constant based on observed and or simulation data, and λ is the wavenumber at the frequency of the flexural wave 13A to be absorbed. The constant α of Equation 4 may be based on the orientation of the resonators 30A and 40A with respect to each other and one or more physical characteristics of the structure 12A. In one example, the constant α is determined based on observation or simulation information, wherein the constant α is the value that maximizes the absorption of the flexural wave 13A acting upon the structure 12A.

In situations where the resonators 30A and 40A substantially face away from one another, such as in the system 10A, it has been observed that the distance d between the locations 18A and 19A is less than a distance t that represents the distance between the terminal ends 36A and 46A. In this example, the distance d can be expressed as $0.02\lambda$. The constant α is 0.02 and was determined based on observation or simulation information that maximized the absorption of the flexural wave 13A acting upon the structure 12A.

Figure 2:
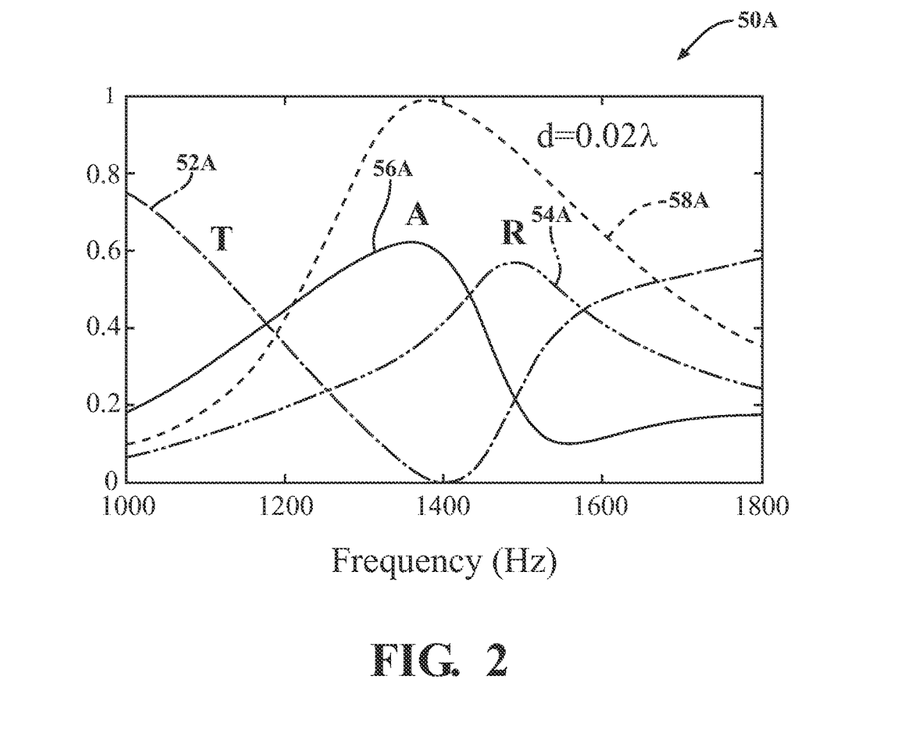
FIG. 2 illustrates the performance of the system of FIG. 1.

The performance of the system 10A is illustrated in the chart 50A of FIG. 2. Here, the amount of absorption 58A of the flexural wave 13A acting upon the structure 12A based on the frequency of the flexural wave 13A is shown. In particular, the system 10A shows excellent wide bandwidth absorption, peaking at near-total absorption at approximately 1380 Hz. For the sake of comparison, the chart 50A also illustrates a transmission 52A, reflection 54A, absorption 56A of a system having resonators that substantially face away, but with different distance, $d=0.2\lambda$.

As shown in the chart 50A, the absorption 58A of the system 10A is superior to the absorption 56A of a system with resonators distance, $d=0.2\lambda$ in both amplitude and bandwidth performance.

Figure 3:
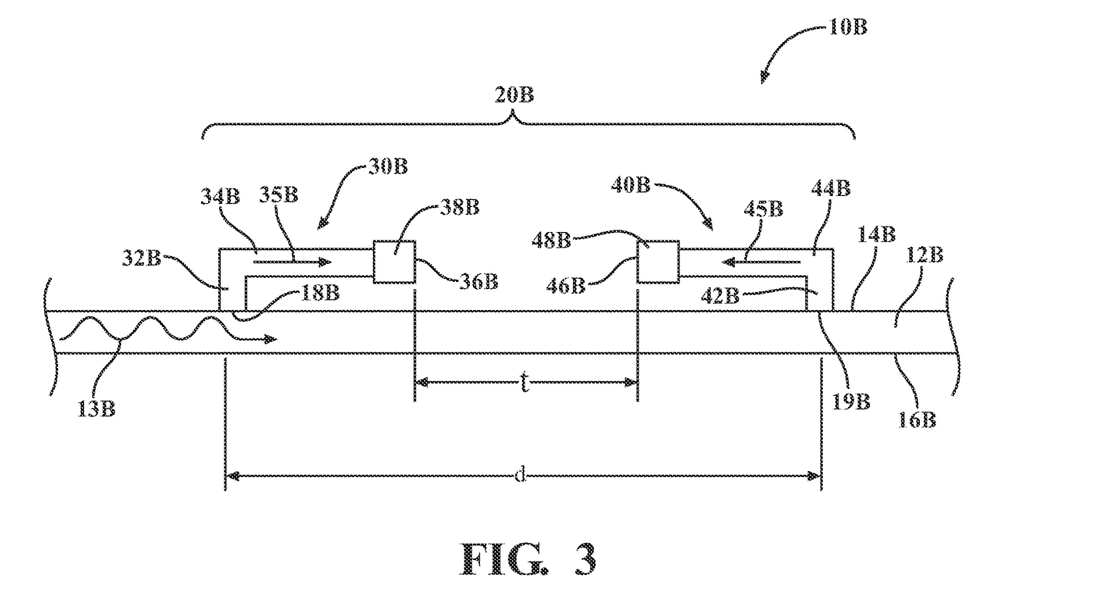
FIG. 3 illustrates a system for absorbing a flexural wave acting upon a structure with resonators that substantially face one another.

FIG. 3 illustrates another example of a system 10B for absorbing flexural waves. This example of the system 10B is similar to the system 10A of FIG. 1. As such, like reference numerals (replacing "A" with a "B" in the reference numerals) have been utilized to refer to like elements. Unless specifically stated otherwise, the description previously provided regarding these like elements provided previously, is equally applicable to this example.

In this example, the system 10B includes a set 20B of resonators 30B and 40B connected to the top side 14B of the structure 12B. In this example, the resonators 30B and 40B are orientated such that they substantially face each other. In other words, the direction 35B that the cantilever member 34B extends from the base 32B and extends towards the other resonator 40B. Similarly, the direction 45B that the cantilever member 44B extends from the base 42B and extends towards the other resonator 30B.

Like before, the distance d between the locations 18B and 19B where the bases 32B and 42B are connected to the top side 14B of the structure 12B, respectively, are based, at least in part, on the frequency of the flexural wave 13B to be absorbed and the orientation of the resonators 30B and 40B with respect to one another. Generally, the distance d between the locations 18B and 19B can be expressed using Equation 4.

Similarly, the constant α for Equation 4 may be based on the orientation of the resonators 30B and 40B with respect to each other and one or more physical characteristics of the structure 12B. In one example, the constant α is determined based on observation or simulation information, wherein the constant α is the value that maximizes the absorption of the flexural wave 13B acting upon the structure 12B.

In situations where the resonators 30B and 40B substantially face toward one another, such as in the system 10B, it has been observed that the distance d between the locations 18B and 19B is greater than a distance t that represents the distance between the terminal ends 36B and 46B. In this example, the distance d can be expressed as $0.35\lambda$. The constant α is 0.35 and was determined based on observation or simulation information that maximized the absorption of the flexural wave 13B acting upon the structure 12B.

Figure 4:
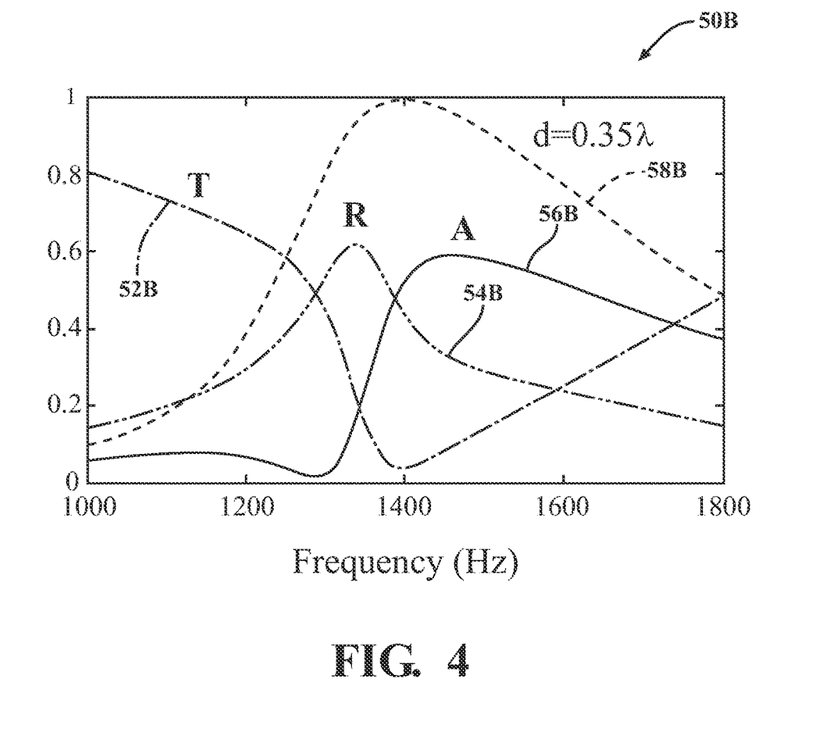
FIG. 4 illustrates the performance of the system of FIG. 3.

The performance of the system 10B is illustrated in the chart 50B of FIG. 4. Here, the amount of absorption 58B of the flexural wave 13B acting upon the structure 12B based on the frequency of the flexural wave 13B is shown. In particular, the system 10B shows excellent wide bandwidth absorption, peaking at near-total absorption at approximately 1380 Hz. For the sake of comparison, the chart 50B also illustrates a transmission 52B, reflection 54B, absorption 56B of a system having resonators that substantially face toward each other with distance, $d=0.2\lambda$.

As shown in the chart 50B, the absorption 58B of the system 10B is superior to the absorption 56B of a system with resonators face toward each other with distance, $d=0.2\lambda$ in both amplitude and bandwidth performance.

Figure 5:
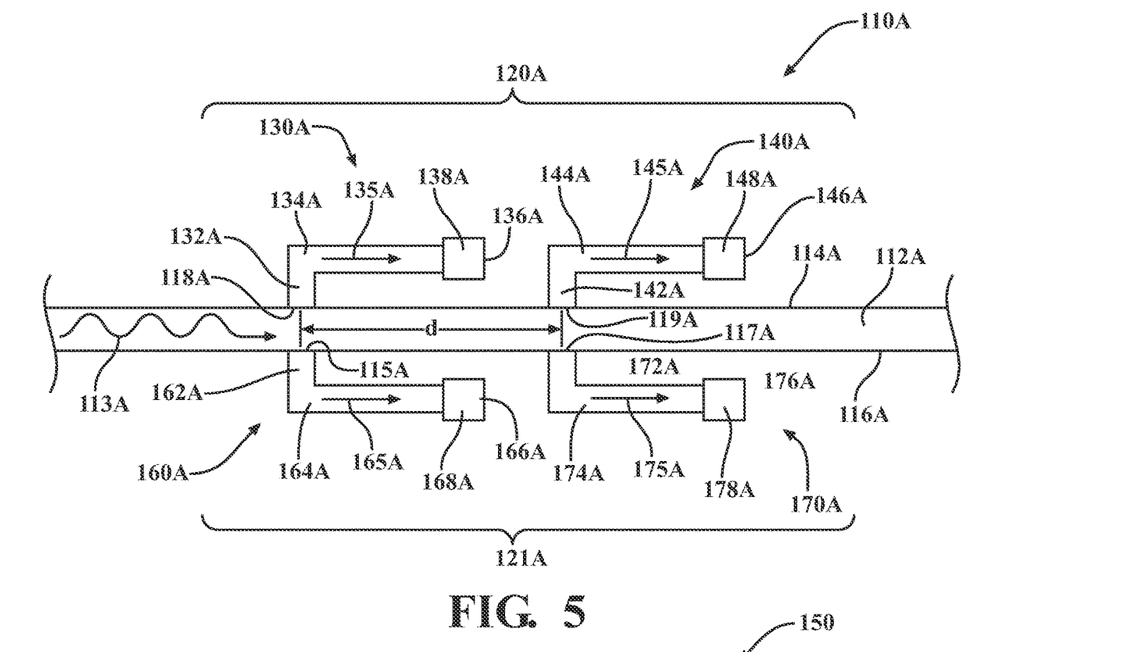
FIG. 5 illustrates a system for absorbing a flexural wave acting upon a structure with resonators substantially facing the same direction connected to both the top and bottom sides of the structure.

Referring to FIG. 5, another example of a system 110A for absorbing flexural waves for broadband absorption is shown. This example of the system 100A has some similarities with the system 10A of FIG. 1. As such, like reference numerals (incremented by 100) have been utilized to refer to like elements. Unless specifically stated otherwise, the description previously provided regarding these like elements provided previously, is equally applicable to this example.

In this example, the system 100A of FIG. 5 differs from that of the system 10A of FIG. 1 in at least two ways. First, it is noted that the system 100A has two sets 120A and 121A of resonators, wherein the first set 120A includes the resonators 130A and 140A, while the second set 121A includes resonators 160A and 170A. The first set 120A of the resonators 130A and 140A are connected to the top side 114A of the structure 112A, while the second set 121A of the resonators 160A and 170A are connected to the bottom side 116A of the structure 112.

Second, it is noted that the resonators 130A and 140A substantially face the same direction with respect to each other. In other words, the direction 135A that the cantilever member 134A extends from the base 132A is the same as the direction 145A that the cantilever member 144A extends from the base 142A.

As to the second set 121A of the resonators 160A and 170A, it is noted that these resonators 160A and 170A are similar to the resonators 130A and 140A, respectively. Notably, the resonator 160A is connected to the bottom side 116A of the structure 112A at a location 115A, while the resonator 170A is connected to the bottom side 116A of the structure 112A at a location 117A. Like the resonators 130A and 140A, the resonators 160A and 170A substantially face the same direction with respect to each other. In other words, the direction 165A that the cantilever member 164A extends from the base 162A is the same as the direction 175A that the cantilever member 174A extends from the base 172A.

Further still, the directions 135A and 145A and the directions 165A and 175A may all point in the same direction. For example, as noted previously, the resonators 130A and 140A face the same direction. The resonators 160A and 170A may also face the same direction as the resonators 130A and 140A. Visually, resonators 130A and 140A are orientated such that they are the mirror image of the resonators 160A and 170A. However, it should be understood that the resonators 130A and 140A and the resonators 160A and 170A may be offset from each other, so they would not be the mirror image of each other.

In this example, one of the resonators 130A and 140A forming the first set 120A is a lossy resonator, while the other may be a lossless resonator. Similarly, one of the resonators 160A and 170A forming the second set 121A may be a lossy resonator, while the other is a lossless resonator. The resonators 130A, 140A, 160A, and/or 170A may each have a resonant frequency substantially similar to the frequency of the flexural wave 113A acting upon the structure 112A.

In the example of the system 100A, the distance d between the connection locations 118A and 119A and the locations 115A and 117A is the same. Like before, the distance d may be calculated using Equation 4. The constant α for Equation 4 may be based on the orientation of the first set 120A of the resonators 130A and 140A and the second set 121A of the resonators 160A and 170A with respect to each other and one or more physical characteristics of the structure 112A. In one example, the constant α is determined based on observation or simulation information, wherein the constant α is the value that maximizes the absorption of the flexural wave 113A acting upon the structure 112A.

Figure 6:
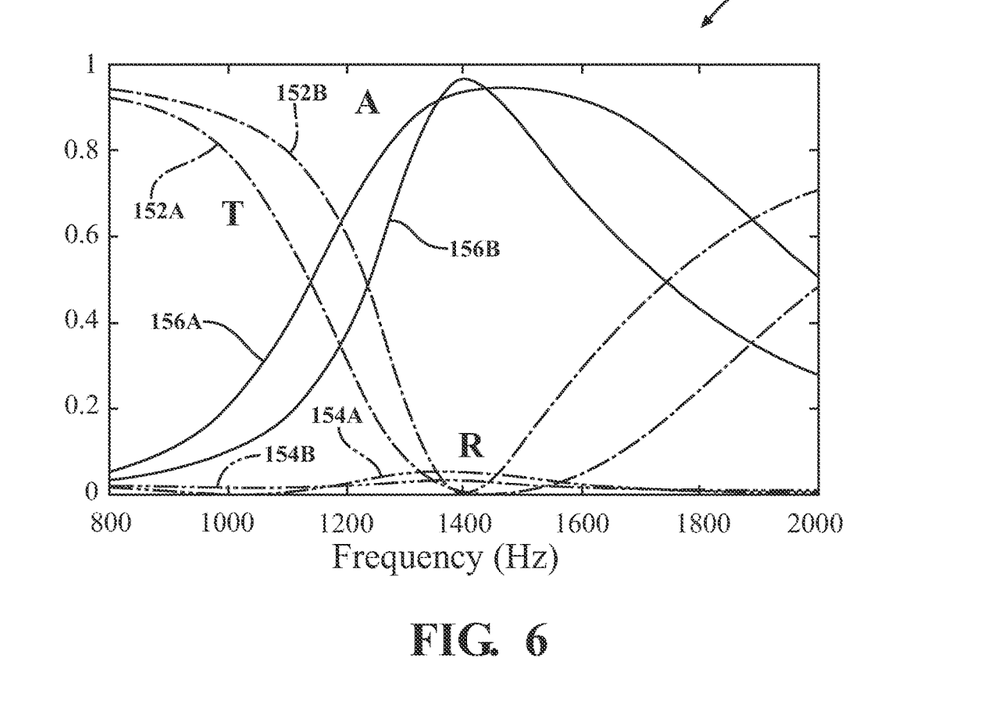
FIG. 6 illustrates the performance of the system of FIG. 5.

The performance of the system 110A is illustrated in the chart 150 of FIG. 6. Here, the amount of transmission 152A, reflection 154A, and absorption 156A of the flexural wave 113A acting upon the structure 112A based on the frequency of the flexural wave 113A is shown. In particular, the system 110A shows excellent broadband absorption, peaking at 95% absorption at approximately 1380 Hz. For the sake of comparison, the chart 150 also illustrates a transmission 152B, reflection 154B, absorption 156B of a system having resonators only two resonators, such as the resonators 130A and 140A.

As shown in the chart 150, the absorption 156A of the system 110A is nearly as good as the absorption of a hypothetical system only having two resonators but also has significantly improved broadband performance across a much wider range of frequencies.

Figure 7:
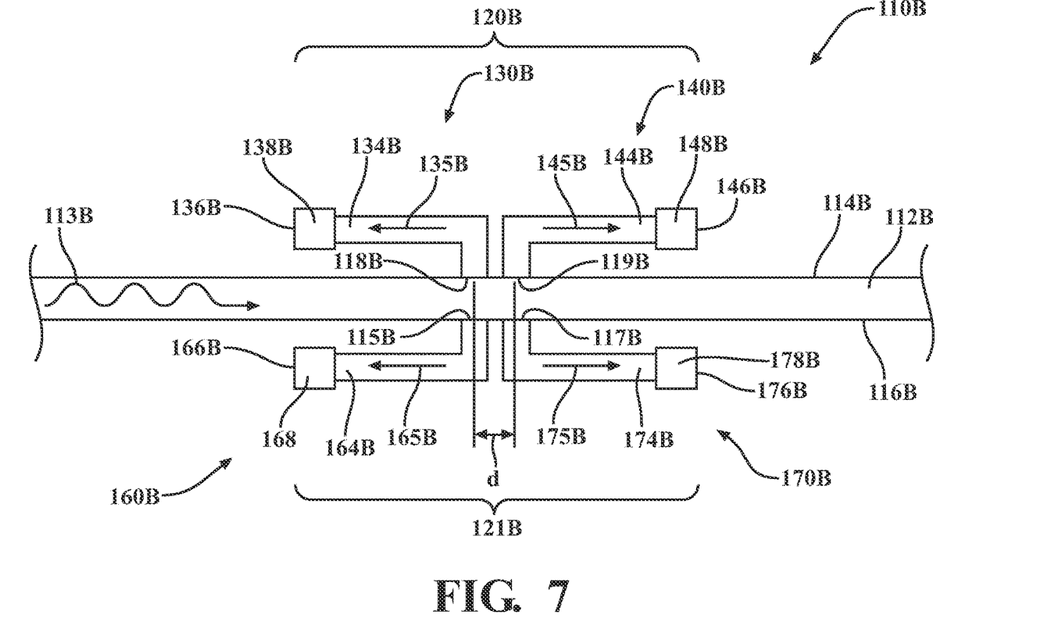
FIG. 7 illustrates a system for absorbing a flexural wave acting upon a structure with resonators substantially facing away from each other and connected to both the top and bottom sides of the structure.
Figure 8:
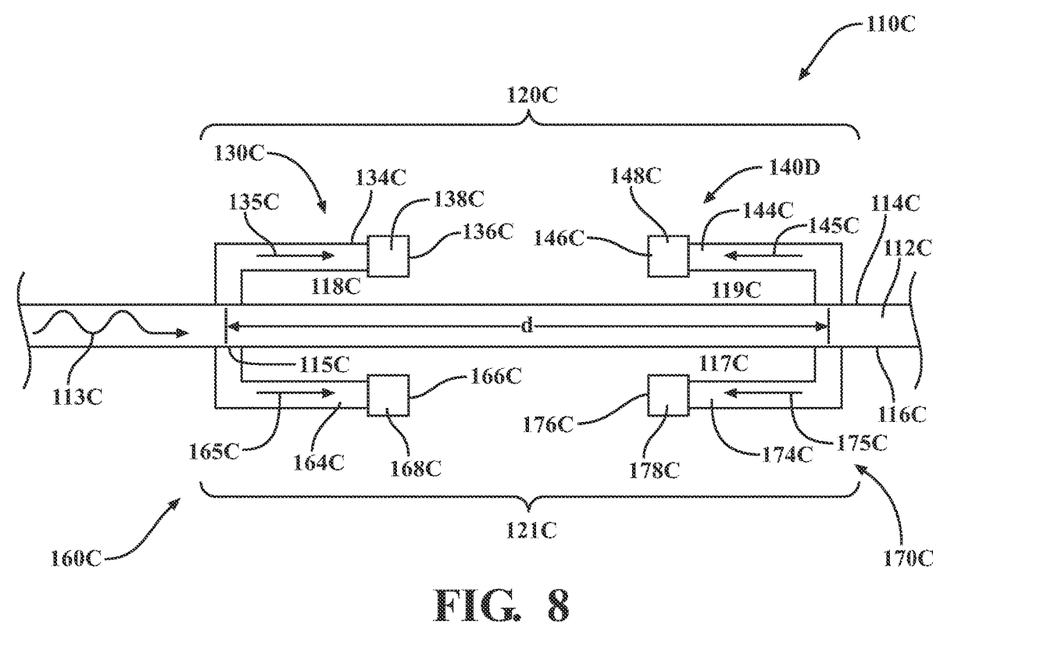
FIG. 8 illustrates a system for absorbing a flexural wave acting upon a structure having resonators substantially facing each other and connected to both the top and bottom sides of the structure.

In the example of the system 110A, the resonators 130A, 140A, 160A, and 170A substantially face the same direction. However, it should be understood that other types of systems wherein the resonators face other directions can also be utilized to absorb flexural waves. For example, referring to FIGS. 7 and 8 shown are different examples of systems that can absorb flexural waves at broadband. Like reference numerals (wherein "A" has been changed to "B" or "C") have been utilized to refer to like elements. Unless specifically stated otherwise, the description previously provided regarding these like elements in any of the preceding paragraphs is equally applicable to the examples in FIGS. 7 and 8.

With particular attention to FIG. 7, the system 110B is similar to the system 110A of FIG. 5 but differs because the resonators 130B and 140B face away from each other, similar to the resonators 30A and 40A of FIG. 1. In like manner, the resonators 160B and 170B also face away from each other. The distance d between the locations 118B and 119B and between the locations 115B and 117B may be calculated similarly as previously explained regarding the calculation of the distance d between the locations 18A and 19A of the system 10A of FIG. 1.

As to FIG. 8, the system 110C is similar to the system 110A of FIG. 5 but differs because the resonators 130C and 140C face toward each other, similar to the resonators 30B and 40B of FIG. 3. In like manner, the resonators 160C and 170C also face away from each other. The distance d between the locations 118C and 119C and between the locations 115C and 117C may be calculated similarly as previously explained regarding the calculation of the distance d between the locations 18B and 19B of the system 10B of FIG. 3.

Variations regarding the examples of the systems described in FIGS. 5, 7, and 8 can also be utilized. For example, a system could include a first set of resonators that face in the same direction, such as the first set 120A of FIG. 5 that are connected to the top side 114A of the structure 112A along with a second set of resonators that face towards each other, such as the resonators 160C and 170C of the second set 121C, or that face away from each other, such as the resonators 160B and 170B of the second set 121B. One side of a structure can have resonators orientated in one manner, while the other side of the structure can have resonators orientated differently.

Figure 9:
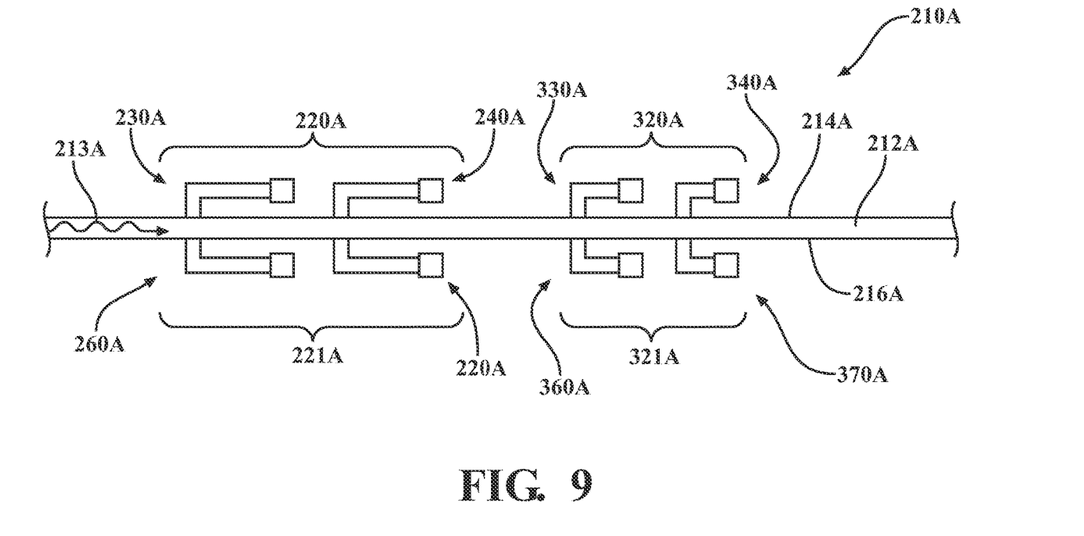
FIG. 9 illustrates a system for absorbing flexural waves acting upon a structure with multiple sets of resonators substantially facing the same direction and connected to both the top and bottom sides of the structure for improved broadband performance.

Referring to FIG. 9, another example of a system 210A for absorbing flexural waves at improved broadband is shown. This example is somewhat similar to the example of the system 110A previously described and shown in FIG. 5. As such, like reference numerals (incremented by 100) have been utilized refer to like elements. Any prior description of these elements is equally applicable to this example unless otherwise noted. Additionally, fewer reference numerals have been utilized in FIG. 9 to improve the overall clarity of the drawings.

The system 210A includes both a first set 220A of resonators 230A and 240A and a second set 221A of resonators 260A and 270A. The first set 220A of resonators 230A and 240A and a second set 221A of resonators 260A and 270A may be similar to the first set 120A of resonators 130A and 140A and the second set 121A of resonators 160A and 170A of FIG. 5. As such, the first set 220A of resonators 230A and 240A are attached to the top side 214A of the structure 212A, while the second set 221A of resonators 260A and 270A are attached to the bottom side 216A of the structure 212A.

The first set 220A of resonators 230A and 240A and the second set 221A of resonators 260A and 270A may be adjusted so that they have a resonant frequency similar to the frequency of a flexural wave 213A acting upon the structure 212A. The first set 220A of resonators 230A and 240A the second set 221A of resonators 260A and 270A can be adjusted as described in the paragraphs above to absorb frequencies of flexural waves of a certain frequency range. The adjustment of the first set 220A of resonators 230A and 240A the second set 221A of resonators 260A and 270A can include adjusting the resonant frequencies of these resonators as well as the distances d between where the resonators are connected to the structure 212A.

However, to improve the broadband performance of the system 210A, also attached to the structure 212A are a third set 320A of resonators 330A and 340A and a fourth set 321A of resonators 360A and 370A. The third set 320A of resonators 330A and 340A and the fourth set 321A of resonators 360A and 370A may be somewhat similar to the first set 220A of resonators 230A and 240A and the second set 221A of resonators 260A and 270A. The third set 320A of resonators 330A and 340A are attached to the top side 214A of the structure 212A, while the fourth set 321A of resonators 360A and 370A are attached to the bottom side 216A of the structure 212A.

However, the third set 320A of resonators 330A and 340A and the fourth set 321A of resonators 360A and 370A are different from the first set 220A of resonators 230A and 240A and the second set 221A of resonators 260A and 270A in that they have been adjusted to have different resonant frequencies for absorbing flexural waves of different frequencies and may be separate from each other at different distances. The third set 320A of resonators 330A and 340A and the fourth set 321A of resonators 360A and 370A may be adjusted to absorb different frequencies of flexural waves acting upon the structure 212A.

Figure 10:
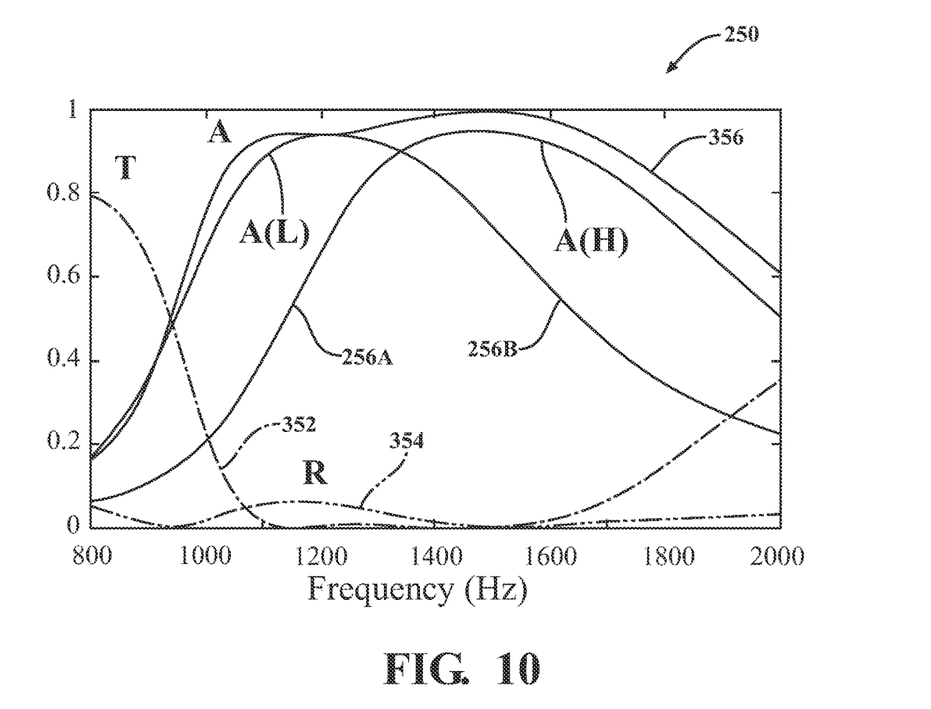
FIG. 10 illustrates the performance of the system of FIG. 9.

By combining the use of multiple sets of resonators, improved broadband performance can be realized. For example, referring to FIG. 10 illustrated is a chart 250 showing the individual absorption performance 256A of one set of resonators, such as the first set 220A of resonators 230A and 240A and the second set 221A of resonators 260A and 270A. Also illustrated is the individual absorption performance 256B of another set of resonators, the third set 320A of resonators 330A and 340A and the fourth set 321A of resonators 360A and 370A. Regarding the absorption performance 256A, it can be observed that there is good absorption between approximately 1000 Hz and 1400 Hz. Regarding the absorption performance 256B, it can be observed that there is good absorption performance between approximately 1400 Hz and 1600 Hz.

When implementing multiple sets of resonators, such as shown in the system 210A, the combined performance of the system can result in improved broadband performance across a much wider range of frequencies. More specifically, because the system 210A utilizes four different sets 220A, 221A, 320A, and 321A of resonators, the individual absorption performances 256A and 256B can essentially be combined to generate the combined performance 356. The combined performance 356 illustrates excellent absorption of flexural waves between 1000 Hz and 1600 Hz. Also illustrated is the combined performance of the transmission 352 and the reflection 354 of the system 210A.

It should be understood that the system 210A can include multiple sets of resonators and not be limited to just the number of sets of resonators shown in FIG. 9. As such, the broadband performance of a system can be improved further by adding additional sets of resonators to absorb additional frequencies of flexural waves acting upon a structure. As explained previously, the resonators forming each of the additional sets will need to be adjusted to have different resonant frequencies as well as be adjusted to have different distances between where the resonators are connected to a particular structure, as explained previously in this disclosure.

Figure 11:
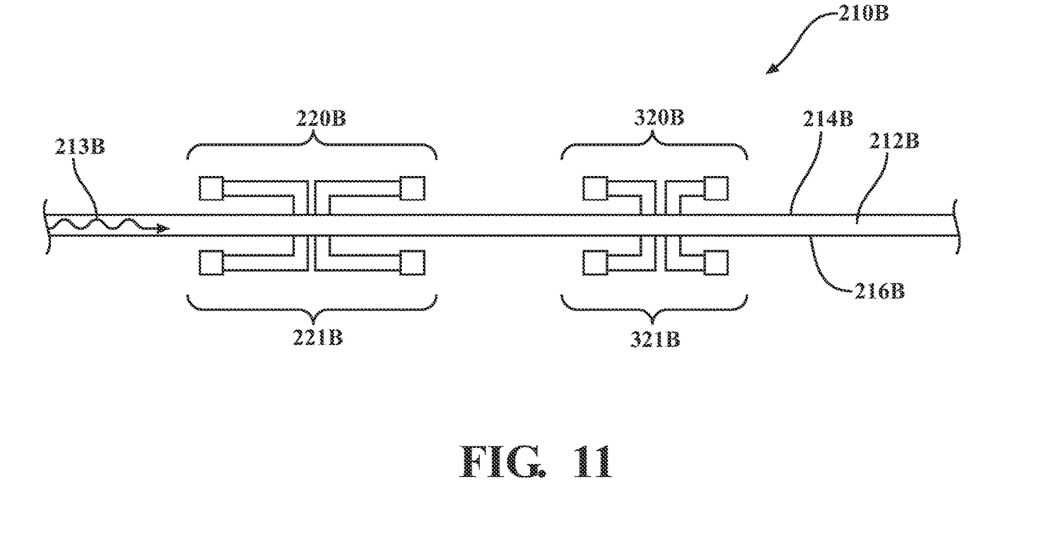
FIG. 11 illustrates a system for absorbing flexural waves acting upon a structure having multiple sets of resonators substantially facing away from each other and connected to both the top and bottom sides of the structure for improved broadband performance.
Figure 12:
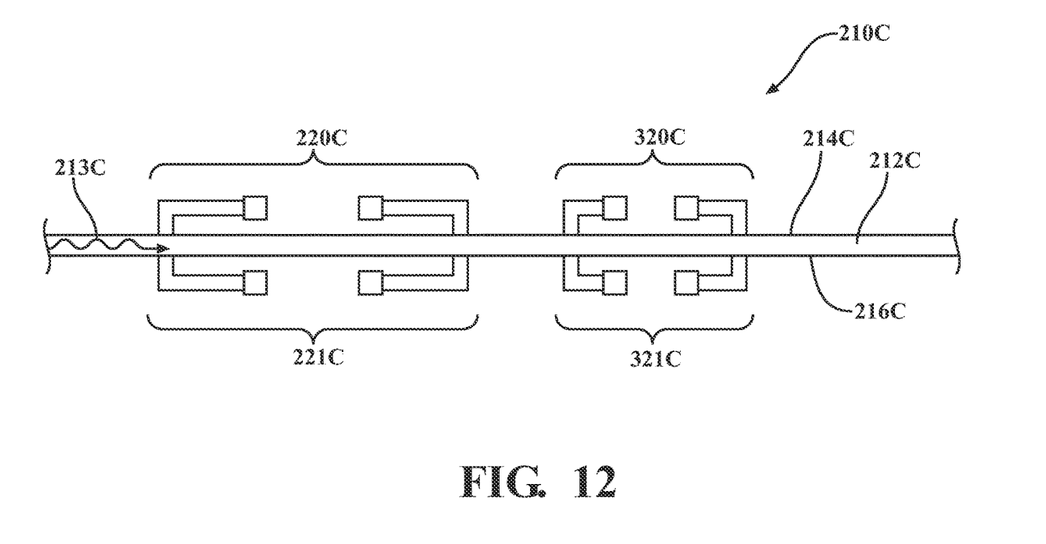
FIG. 12 illustrates a system for absorbing flexural waves acting upon a structure with multiple sets of resonators facing each other and connected to both the top and bottom sides of the structure for improved broadband performance.

Further still, it should be understood that the orientation of the resonators with respect to each other can vary from application to application. In the example shown in FIG. 10, the system 210A includes resonators 230A, 240A, 260A, 270A, 330A, 340A, 360A, and 370A, which all substantially face the same direction. However, it should also be understood that the resonators' orientation can change and can be mixed and matched based on the ultimate application. For example, FIG. 11 illustrates resonator sets 220B, 221B, 320B, and 321B having resonators that substantially face away from each other, similar to what was shown and described in FIG. 7. FIG. 12 illustrates resonator sets 220C, 221C, 320C, and 321C having resonators that substantially face each other, similar to what was shown and described in FIG. 8.

Additionally, a system could also have sets of resonators wherein some or all of the sets of resonators have different orientations. For example, a system could be devised that includes one set of resonators that face in the same direction, another set of resonators that face in the opposite direction, and another set of resonators that face in the same direction. Again, different types of applications may require different orientations of the resonators in these orientations can vary based on the needs of the application.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The terms "a" and "an," as used herein, are defined as one or more than one. The term "plurality," as used herein, is defined as two or more than two. As used herein, the term "another" is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a first cantilever resonator connected to a flat side of a single beam at a first location;
a second cantilever resonator connected to the flat side of the single beam at a second location; and
wherein a distance between the first location and the second location extends along a length of the flat side of the single beam and is expressed as $a\lambda$, wherein $\lambda$ is a wavenumber at a frequency of a flexural wave to be absorbed and $\alpha$ is 0.02 when the first and second cantilever resonators face away from each other and is 0.2 when the first and second cantilever resonators face toward each other.

2. The system of claim 1, wherein:
the first cantilever resonator includes a first support base and a first cantilever member that extends in a first direction from the first support base and terminates in a first terminal end; and
the second cantilever resonator includes a second support base and a second cantilever member that extends in a second direction from the second support base and terminates in a second terminal end.

3. The system of claim 2, wherein an orientation of the first cantilever resonator and the second cantilever resonator with respect to each other is such that the first direction that the first cantilever member extends from the first support base substantially opposes the second direction that the second cantilever member extends from the second support base.

4. The system of claim 3, wherein the first terminal end and the second terminal end are separated by a distance that is less than the distance between the first location and the second location.

5. The system of claim 3, wherein the first terminal end and the second terminal end are separated by a distance that is greater than the distance between the first location and the second location.

6. The system of claim 1, wherein the first cantilever resonator and the second cantilever resonator have resonant frequencies substantially similar to the frequency of the flexural wave acting upon the single beam.

7. The system of claim 6, wherein the first cantilever resonator is a lossy resonator and the second cantilever resonator is a lossless resonator.

8. A system comprising:
- a top set of cantilever resonators connected to a flat top side of a single beam, the top set of cantilever resonators separated from each other by a distance along a length of the flat top side of the single beam; and
- a bottom set of cantilever resonators connected to a flat bottom side of the single beam, the bottom set of cantilever resonators separated from each other by the distance along a length of the flat bottom side of the single beam; and
- wherein the distance is expressed as $a\lambda$, wherein $\lambda$ is a wavenumber at a frequency of a flexural wave to be absorbed and $\alpha$ is 0.02 when the top set of cantilever resonators face away from each other and is 0.2 when the top set of cantilever resonators face toward each other.

9. The system of claim 8, wherein resonators forming at least one of the top set of cantilever resonators and the bottom set of cantilever resonators comprise:
- a first cantilever resonator having a first support base and a first cantilever member that extends in a first direction from the first support base and terminates in a first terminal end, the first support base being connected to the single beam at a first location;
- a second cantilever resonator having a second support base and a second cantilever member that extends in a second direction from the second support base and terminates in a second terminal end, the second support base being connected to the single beam at a second location.

10. The system of claim 9, wherein an orientation of the first cantilever resonator and the second cantilever resonator with respect to each other is such that the first direction that the first cantilever member from the first support base is such that it substantially opposes the second direction that the second cantilever member from the second support base.

11. The system of claim 9, wherein the first cantilever resonator and the second cantilever resonator have resonant frequencies substantially similar to the frequency of the flexural wave acting upon the single beam.

12. The system of claim 9, wherein the first cantilever resonator is a lossy resonator and the second cantilever resonator is a lossless resonator.

13. A system comprising:
- a first set of cantilever resonators connected to a single beam, the first set of cantilever resonators separated from each other at a first distance along a length of the single beam, wherein the distance is expressed as $a\lambda$, wherein $\lambda$ is a wavenumber at a first frequency of a first flexural wave to be absorbed and $\alpha$ is 0.02 when the first set of cantilever resonators face away from each other and is 0.2 when the first set of cantilever resonators face toward each other; and
- a second set of cantilever resonators connected to the single beam, the second set of cantilever resonators separated from each other at a second distance along the length of the single beam based on a second frequency of a second flexural wave acting upon the single beam and an orientation of the second set of cantilever resonators with respect to each other.

14. The system of claim 13, wherein cantilever resonators forming at least one of the first set of cantilever resonators and the second set of resonators comprise:
- a first cantilever resonator having a first support base and a first cantilever member that extends in a first direction from the first support base and terminates in a first terminal end, the first support base being connected to the single beam at a first location; and
- a second cantilever resonator having a second support base and a second cantilever member that extends in a second direction from the second support base and terminates in a second terminal end, the second support base being connected to the single beam at a second location.

15. The system of claim 13, wherein:
cantilever resonators forming the first set of cantilever resonators have resonant frequencies substantially similar to the first frequency of the first flexural wave acting upon the single beam; and
cantilever resonators forming the second set of cantilever resonators have resonant frequencies substantially similar to the second frequency of the second flexural wave acting upon the single beam.

\* \* \* \* \*